United States Patent [19]

Baldwin et al.

[11] Patent Number: 4,724,875
[45] Date of Patent: Feb. 16, 1988

[54] TRAILER-MOUNTED PORTABLE OIL CHANGE AND LUBRICATING SYSTEM FOR MOTOR VEHICLES

[75] Inventors: Wendell Baldwin, Montrose; Harley D. Longan, Parker; Dudley R. Seifert, Aurora; Stanley A. Williams, Denver, all of Colo.

[73] Assignee: Porta-Lube, Inc., Denver, Colo.

[21] Appl. No.: 933,480

[22] Filed: Nov. 21, 1986

[51] Int. Cl.⁴ .............................................. B65B 3/04
[52] U.S. Cl. ...................................... 141/98; 141/232; 141/266; 184/1.5; 137/234.6; 224/42.23; 187/8.59; 187/8.72; 254/89 R
[58] Field of Search ....... 137/234.6; 141/98, 232–233, 141/270–284, 369–372, 373–381, 367, 368, 392, 86, 87, 88; 184/1.5; 224/42.23, 275; 206/216, 223; 220/1 C; 187/8.59, 8.72; 254/89 R

[56] References Cited

U.S. PATENT DOCUMENTS

| | | | |
|---|---|---|---|
| 2,358,501 | 9/1944 | Frova | 254/89 |
| 2,576,426 | 11/1951 | Thurzó | 254/10 |
| 3,051,340 | 8/1962 | Ely | 214/512 |
| 3,536,161 | 10/1970 | Clarke | 187/8.59 |
| 3,865,214 | 2/1975 | Clark | 187/8.72 |
| 3,931,895 | 1/1976 | Grimaldo | 214/1 A |
| 4,328,114 | 12/1980 | Migliorati | 254/88 |
| 4,373,701 | 2/1983 | Kishi | 254/122 |
| 4,394,877 | 7/1983 | Whyte | 141/98 |
| 4,445,665 | 5/1984 | Cray | 254/88 |

OTHER PUBLICATIONS

Sales brochure by Paravion Industries, Inc. through Carr Lifts, Inc.

Primary Examiner—Houston S. Bell, Jr.
Attorney, Agent, or Firm—John E. Reilly

[57] ABSTRACT

A vehicle-servicing trailer is attachable to a pulling vehicle for transporation to the intended servicing site, the trailer having a hydraulically controlled lift apparatus, ramps on opposite sides of the trailer for advancement of a vehicle to be serviced onto the trailer, and outriggers are stationed at the four corners of the trailer to cooperate in supporting a vehicle on the trailer. When the vehicle is loaded on the trailer via the ramps, the lift is activated to raise the track members and vehicle to be serviced so that the underside of the vehicle is accessible, and outboard extensions on the track members enable a service man or operator to gain access to the engine compartment and interior of the vehicle. A movable dolly is positioned centrally of the trailer to permit the operator to slide beneath the vehicle and to perform necessary servicing operations, such as, oil changes and lubrication jobs. An oil drain tank is incorporated into the trailer to receive waste oil and the necesary oil and grease lines extend from suitable sources of supply at the rear of the pulling vehicle to facilitate servicing.

15 Claims, 7 Drawing Figures

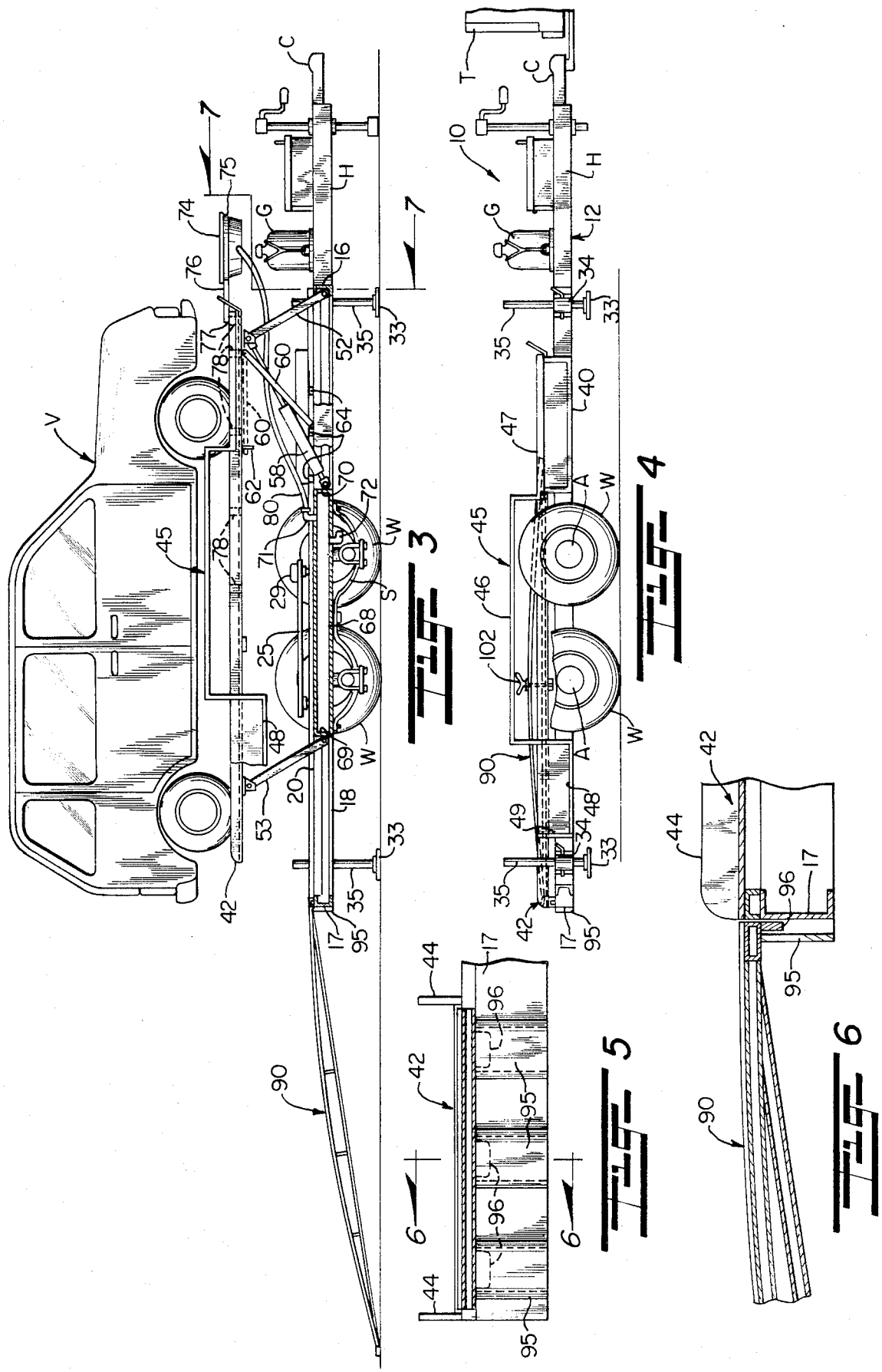

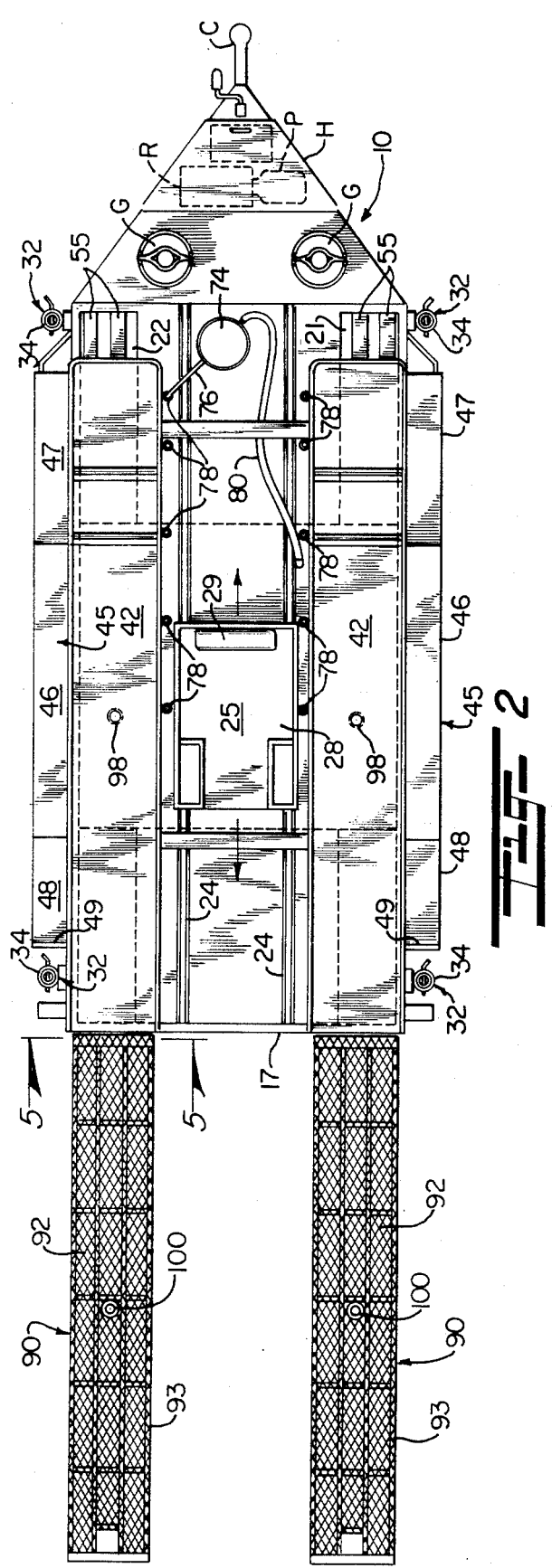
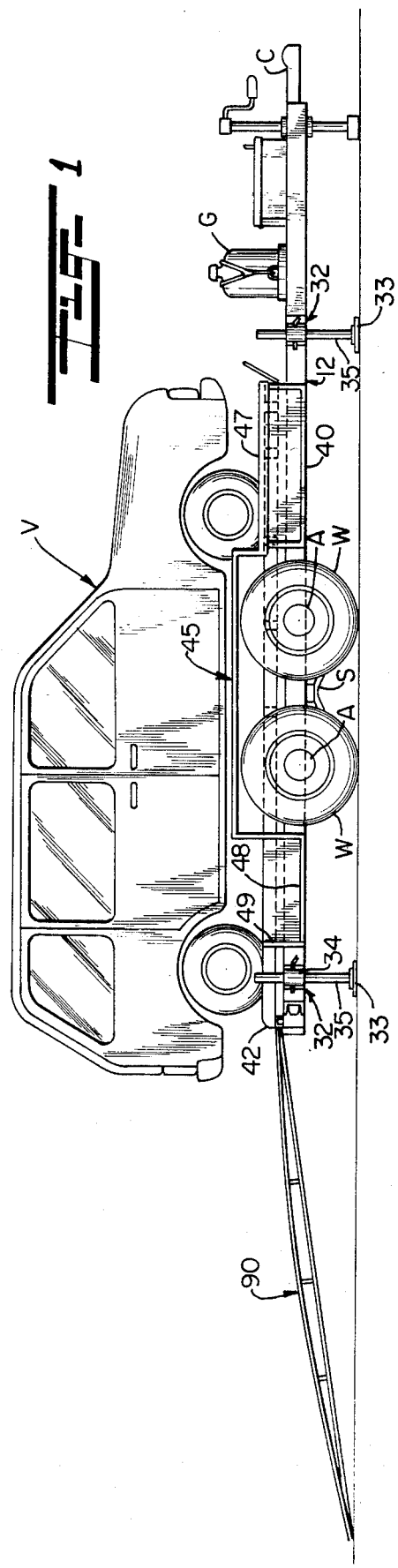

TRAILER-MOUNTED PORTABLE OIL CHANGE AND LUBRICATING SYSTEM FOR MOTOR VEHICLES

This invention relates to vehicle servicing apparatus and more particularly relates to a novel and improved trailer-mounted portable oil change and lubricating apparatus for motor vehicles.

BACKGROUND AND FIELD OF THE INVENTION

A portable lift apparatus has been devised for servicing vehicles out in the field so that it is not necessary for the vehicle to be taken into a service station to perform minor repairs or otherwise service the vehicle, such as, performing lubrication or oil changes. In devising a portable lift apparatus it is important that the apparatus be conformable for use with the myriads of different styles and designs or types of vehicles so that the vehicle to be serviced can be lifted to the desired height, securely locked or supported in the raised position while affording convenient accessibility to the underside of the vehicle as well as to the engine compartment and interior. Moreover, it is desirable that the servicing equipment and tools be conveniently accessible for use in servicing different types and makes of automobiles so that the automobile can be rapidly and dependably serviced.

Of the portable lift apparatus devised in the past, U.S. Pat. No. 3,931,895 to S. Grimaldo is of interest for disclosing a hydraulically operated lift mechanism associated with a trailer for servicing of a vehicle. Similarly, U.S. Pat. No. 4,445,665 to D. L. Cray discloses a portable lift which is trailer mounted and includes a chair assembly to permit servicing from the underside of the vehicle. In trailer-mounted vehicle servicing devices, it is known to employ outriggers in association with the trailer to firmly support the automobile or vehicle to be serviced in the raised position and representative patents are U.S. Pat. Nos. 3,051,340 to H. L. Ely and 4,373,701 to M. Kishi. In this respect, it is desirable that the portable lift apparatus be devised such that it can be adjustably locked in different positions. Other U.S. Letters Patent of interest in this area are U.S. Pat. Nos. 3,865,214 to H. J. Clark et al; 3,536,161 to J. E. Clarke; and 4,238,114 to P. I. Migliorati.

SUMMARY OF THE INVENTION

It is therefore an object of the present invention to provide for a novel and improved trailer-mounted, portable lift apparatus for motor vehicles which is rugged and compact.

Another object of the present invention is to provide for a novel and improved trailer-mounted, portable lift apparatus which is readily conformable for servicing different sizes and makes of motor vehicles.

A further object of the present invention is to provide for a novel and improved portable lift apparatus for vehicles which is so constructed and arranged as to enable the vehicle to be raised to different heights and securely locked in position at the selected height.

A still further object of the present invention is to provide for a novel and improved trailer-mounted, portable lift apparatus for motor vehicles in which the lift members for the vehicle include outboard extensions to facilitate access to all parts of the vehicle; and further wherein the necessary servicing equipment and tools are readily accessible for use in servicing each vehicle.

The above and other objects, advantages and features of the present invention will become more readily appreciated and understood from a consideration of the following detailed description of a preferred embodiment of the present invention when taken together with the accompanying drawings of a preferred embodiment of the present invention, in which:

BRIEF DESCRIPTION OF THE DRAWINGS

FIG. 1 is a side view of preferred form of vehicle servicing trailer constructed in accordance with the present invention and illustrating a vehicle to be serviced after it has been advanced onto the trailer as a preliminary to servicing;

FIG. 2 is a top plan view of the trailer illustrated in FIG. 1 with a ramp assembly illustrated in the extended position;

FIG. 3 is a side view corresponding to that of FIG. 1 but with the vehicle in the raised position for servicing;

FIG. 4 is a side view of the preferred form of apparatus of the present invention with the ramp assembly in the stowed position on the trailer;

FIG. 5 is a cross-sectional view taken about lines 5—5 of FIG. 2;

FIG. 6 is a cross-sectional view taken about lines 6—6 of FIG. 5; and

DETAILED DESCRIPTION OF THE PREFERRED EMBODIMENT

Figure 7:
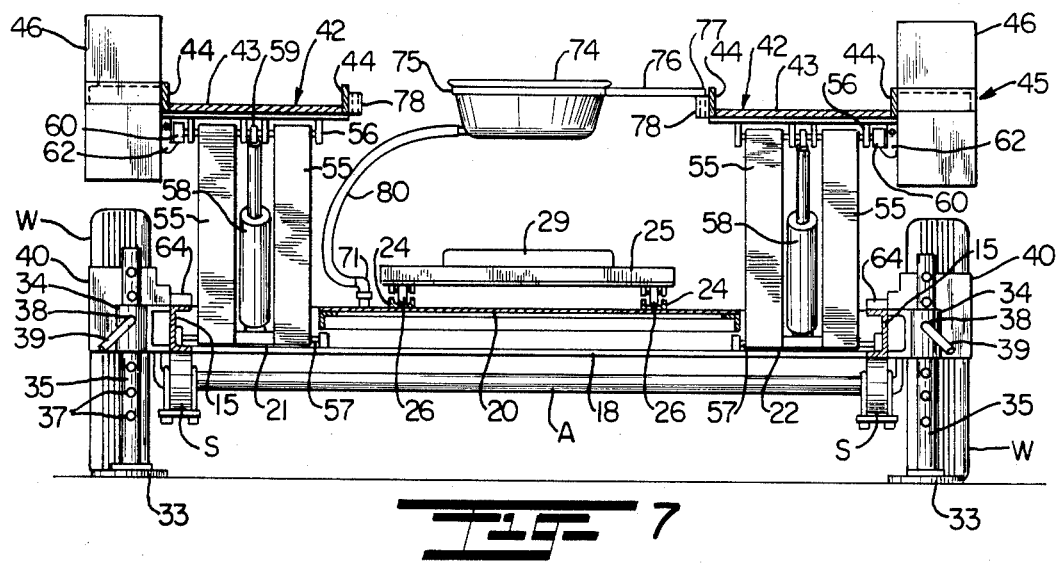
FIG. 7 is a front view partially in section of the trailer assembly with the lift members in the raised position.

Referring in more detail to the drawings, in a preferred form of portable lift apparatus a trailer 10 is broadly comprised of a horizontal framework 12 supported on pairs of front and rear, ground-engaging wheels W, each pair of wheels disposed on a common axle A. The framework 12 is mounted by conventional leaf spring suspension members S above the wheel axles A, and the framework 12 terminates at its leading end in a conventional V-hitch H including a coupling C for releasable attachment to a pulling or tow vehicle T as shown in FIG. 4.

The framework 12 is of generally rectangular configuration having laterally spaced, longitudinally extending channels or beam members 14 and front and rear channel or beam members 16 and 17 rigidly attached to the side channels 15. A flatbed 18 spans the lower edges of the channels 15, 16 and 17 and is rigidly or permanently affixed to the channels to form a main support bed for the entire trailer. A platform 20 is centered on the bed 18, the platform traversing the entire length of the framework and forming with the side channels 15 longitudinally extending recessed areas 21 and 22 along either side of the trailer. Generally U-shaped guide rails 24 are positioned in laterally spaced relation to one another on the platform 20 to receive the wheels 26 of a dolly 25. The dolly 25 has an upper flat surface 28 and padding 29 extending the full length of the dolly, the dolly itself being of a length to permit an operator to recline or lie on the dolly and advance himself along the length of the trailer in servicing the underside of the vehicle.

When the trailer is parked at the intended site of use and as a preliminary to loading of a vehicle on the trailer for servicing, outriggers 32 are activated to support the trailer and vehicle. The outriggers 32 are positioned at the four corners of the trailer framework 12, each outrigger being mounted on an outer support tube 34 which is affixed to the side channels 15. Each outrigger includes a post 35 slidable through a sleeve 36, the post having a base 33. One of a series of vertically spaced openings 37 in each post can be brought into alignment or registry with diametrically opposed openings 38 in the sleeve 36 for insertion of a locking pin 39. Storage compartments 40 are affixed to the support tubes 34 directly adjacent to each of the forward outriggers 32, each storage compartment being of generally elongated rectangular configuration and being open at its upper end for placement and removal of miscellaneous equipment and servicing tools.

The preferred form of portable lift apparatus comprises track members 42 which are of generally wide, shallow channel-shaped configuration and extend lengthwise above the guideways 21 and 22 for the greater length of the trailer, each track member having a flat bottom surface 43 and opposed, upwardly directed sides 44. Specifically, the width of each track member is such that in the lowered position as shown, for example, in FIG. 1, has one edge resting on the platform 20 and an opposite lower edge resting on a channel 15. The track members are spaced apart with the distance between center lines corresponding to the wheel base of most conventional makes of automobiles, and each track member is given a width to accommodate variations in the wheel bases of different motor vehicles.

Outboard extensions 45 extend laterally and away from each track member, each extension including a raised fender portion 46 and a forward horizontally extending portion 47. In addition, a lower horizontally stepped supporting portion 48 terminates in an upwardly directed end wall 49, the forward horizontal portion 46 overlies the storage compartment 40 on each side, and a lower stepped portion 48 extends rearwardly and substantially in the plane of the lower edge of the framework 12. Preferably, the outboard extensions are made up of heavy-duty metal plate with the raised fender portions 46 extending over the wheels W when the frame is in the lowered position and are raised and lowered with the track members. In this manner, the outboard extensions 45 function not only as mud guards but facilitate access to the vehicle V when positioned on the trailer. Thus, the outboard extensions 45 effectively serve as running boards to permit the operator to walk along the front and hood or engine compartment sections of the vehicle.

In order to raise the track members 44 and a vehicle positioned thereon, a preferred form of portable lift apparatus comprises front and rear pivot links 52 and 53, each pivot link having spaced parallel arm members 55 pivotally connected at their upper ends to hinge pins on the underside of a track member 42 as designated at 56. In turn, the lower ends of each pair of arm members 55 are pivotally connected by hinge pins 57 to a channel member 15 and side of the platform 20, respectively, as shown in FIG. 7. The lower ends of the front pivot links 52 are pivotally connected at the juncture of the channel 15 to the V-hitch, and the rear pivot links 53 are pivotally connected at a point just rearwardly of the rear wheels W. Both the front and rear pivot links extend rearwardly away from their points of lower connection for pivotal connection to the undersides of the track members 42 so as to effectively form a parallelogram linkage between the channels 15 and track members 42. The front and rear pivot links 52 and 53 are simultaneously raised by a pair of hydraulic cylinders 58, there being a cylinder 58 associated with each of the front pivot links 52. Preferably, each cylinder 58 extends forwardly from its pivotal connection within a recessed area 21 or 22 to terminate in a piston end 59 which is pivotally connected intermediately between the upper pivotal connecting ends of the front arm members 55. Hydraulic fluid is delivered under pressure via suitable lines, not shown, to each of the cylinders from a reservoir R under the control of a pump P. Thus, when the pump is activated to deliver hydraulic fluid under pressure to each of the cylinders, the track members 42 are raised above the platform 22, as noted from FIG. 3, until the motor vehicle is raised to the desired level. The pump is then shifted to neutral in order to maintain hydraulic pressure in the cylinders and support the vehicle at the desired level. For the purpose of illustration, the cylinders 58 are Model No. 4Z448A of Dayton Electric Manufacturing Co. of Chicago, Ill., and the pump P is a Model No. 4Z185 manufactured and sold by the same company. As a failsafe feature, locking bars 60 are connected in hinged relation to the undersides of the track members 42 just rearwardly of each of the front pivot links. The bars 60 are normally stowed in a position extending along the undersides of the track members by retainer hooks 62. However, when the track members are lowered, the hooks 62 move into engagement with the upper edges of the channels to release from engagement with the track members. In this way, when the track members 42 are raised, the lower ends of the bars are free to move downwardly into a position between and ahead of one of a series of horizontally spaced stops 64 on each of the channels 15. In the event of a failure or sudden loss of pressure in the cylinders 58, the bars 60 will prevent sudden collapse of the track members and vehicle. By virture of the coordinated movement between the front and rear pivot links 52, 53, it is necessary only to employ locking bars at the front ends so as to effectively lock both the front and rear ends. In lowering the track members by shifting the pump control to release the pressure in the cylinders, the locking bars are raised out of the path of the stops; and in some cases, in order to release the bars 60, it may be necessary to raise the track members 42 a limited distance necessary to permit the lower ends of the locking bar 60 to clear the stops, after which the pressure in the cylinders is slowly released and returned to the reservoir. The hooks 62 are then manually return into position against the bars 60, as shown in FIG. 7.

In order to make oil changes in the vehicle, an oil tank 68 of broad shallow rectangular configuration is built into the framework 12. Preferably, the oil tank 68 traverses the entire width of the framework between the lower connecting ends for the rear pivot links 53 and cylinders 58, the tank enclosure being formed by the lower bed 18, upper platform surface 20, side channels 15 and front and rear vertical walls 69 and 70. The walls 69 and 70 are welded to the platform 20 and lower bed 18 and extend transversely of the length of the trailer between the channels 15 to form a sealed chamber or housing for storage of waste oil or other liquid. The tank 68 includes an inlet 71 projecting upwardly from the upper platform surface 20 and a drain 72 extending downwardly from the bed 18. An oil pan 74 of shallow cylindrical configuration includes a bracket 75 with a horizontally extending support arm 76 which terminates in a pivot 77 for selective releasable insertion into one of a series of sleeves 78 spaced along the opposed inner facing surfaces of the track members 42. A drain hose 80 extends away from the base of the pan 74 for connection into the inlet 71 of the oil tank. Thus, the oil pan may be easily changed in order to conveniently position it under the vehicle for removal of the waste oil, transmission fluid or coolant. The waste liquid is then delivered by gravity through the drain hose into the oil tank 68. Waste liquid is periodically drained from the oil tank 68 as required by opening the lower drain or spigot 72 and removing into another receptacle.

Preferably, the track members are constructed of expanded metal sheet along the tread surfaces. Similarly, a pair of elongated rectangular ramps 90 have tread surfaces 92 of expanded metal construction mounted on open frames 93. Preferably, the frame 93 is of increased width toward the center of each ramp to lend a somewhat bowed construction to the ramp members as illustrated in FIGS. 3 and 6. In the extended position as shown in FIG. 3, the ramps incline downwardly and rearwardly from connection to the rear end of the framework 12 and, to this end, the rear channel 17 of the framework has a plurality of rectangular sleeves 95 for releasable insertion of bars 96 which project downwardly from the leading ends of the ramps for insertion into the sleeves. In the extended position as shown, the upper surface of the ramp will form a substantially flush extension of the upper surface of each track member for smooth rolling advancement of a vehicle along the ramp and onto or from the track members, as illustrated in FIG. 1. After the vehicle has been serviced, the ramps are released from the sleeves and slid forwardly over the track members. The ramps may be secured in a stored position on the trailer in any suitable manner and, for instance, include an opening 98 in each ramp which will align with openings 100 in the track members for insertion of a fastener, such as, the pin or bolt member 102.

In operation, the trailer is towed to the desired site for servicing of a vehicle. The outriggers 32 are lowered into position to support the load of the vehicle, and the ramp members are extended from the rear of the trailer in order to drive the vehicle onto the track members 42. The pump P is activated to lift the track members 42 and vehicle load and, as the track members move away from the trailer bed, the locking bars 60 having been previously released from the hooks 62 are free to slide along the stop members 64 until the vehicle has been raised to the desired height. The operator is then free to leave the vehicle by way of the outboard extensions 45. In order to perform an oil change, the oil pan 74 is positioned as described and the waste oil removed from the vehicle into the oil tank 68. Servicing underneath the vehicle is greatly facilitated by use of the dolly 25 in positioning the oil pan in place, removing waste oil as well as performing other standard lubrication operations. For this purpose, most desirably grease containers G are positioned at the front end of the trailer on the V-hitch and include grease liner, not shown, which may be suitably pressurized by a compressor, not shown, mounted under the hood of the towing vehicle. Although not shown, a separate oil container may be stored in the back of the tow vehicle and include an oil line for the purpose of adding oil to the vehicle being serviced.

It will be appreciated that in the raised position the front storage compartments 40 are accessible for placement or removal of tools as needed for the various servicing operations. Once servicing is completed, the track members 42 are lowered by releasing pressure from the cylinders 58 as described and the vehicle then may be driven off of the trailer. When it is desired to transport the trailer to another site, the ramps 90 are replaced on the trailer and the outriggers 32 raised to place the entire load of the trailer on the ground-engaging wheels W.

It is therefore to be understood from the foregoing that various other modifications and changes may be made in the construction and arrangement of parts comprising the present invention without departing from the spirit and scope thereof as defined by the appended claims.

We claim:

1. A portable lift apparatus for servicing vehicles having fore and aft pairs of ground-engaging wheels thereon comprising:
   a trailer having lower wheel members and an upper rigid supporting frame;
   longitudinally extending, laterally spaced track members on opposite sides of said frame to support the fore and aft pairs of ground-engaging wheels of a vehicle thereon, pivot means pivotally interconnecting said track members and said frame, and hydraulic lift means for selectively, adjustably lifting said track members between a retracted position resting on said frame and a raised position supporting said ground-engaging wheels of the vehicle in spaced relation to said frame; and
   adjustable locking members interposed between at least one of said track members and said frame to lock said track members in the raised position above said frame established by said hydraulic lift means.

2. A portable lift apparatus according to claim 1, a raised platform extending between said track members, and a wheeled dolly member supported on said platform for longitudinal movement thereon.

3. A portable lift apparatus according to claim 2, said raised platform including longitudinally extending tracks, and said dolly including dolly wheels inserted in said guide tracks for movement therealong.

4. A portable lift apparatus according to claim 1, including an oil storage tank mounted on said frame and a movable drain pan supported on said frame for draining oil from a vehicle being serviced into said oil tank.

5. A portable lift apparatus according to claim 4, said movable drain pan including a flexible hose extending between said drain pan and said tank, a support arm and swivel support means for releasably receiving said support arm for swiveled movement of said drain pan into a position beneath the vehicle being serviced.

6. A portable lift apparatus according to claim 4, said ramp members being telescopically received within said channels of said track members.

7. A portable lift apparatus according to claim 1, said track members each having outboard extension means overlying said pairs of ground-engaging wheels in the retracted position and lifted to the raised position with said track members, said outboard extension means operative to support personnel in servicing said vehicle.

8. A portable lift apparatus according to claim 1, said track members in the form of longitudinally extending channels, and means including ramp members extendible from said channels to slope downwardly and rearwardly to a ground surface from said channels to facilitate driving a vehicle onto said track members.

9. A portable lift apparatus according to claim 7, said frame including a storage area covered by said outboard extension means when said track members are in the lowered position and said storage area being uncovered when said track members are lifted to the raised position.

10. A portable lift apparatus according to claim 1, said hydraulic lift means including hydraulic cylinders pivotally connected to each of said track members, and said pivot means including pivot links pivotally connected to said track members flanking opposite sides of each of said hydraulic cylinders.

11. A portable lift apparatus for servicing vehicles having fore and aft pairs of ground-engaging wheels thereon comprising:
a trailer having ground-engaging wheel members and an upper fixed supporting framework;
longitudinally extending, laterally spaced track members on opposite sides of said framework to support said pairs of ground-engaging wheels of a vehicle to be serviced thereon, pivot link means pivotally interconnecting said track members and framework, hydraulic lift means for adjustably lifting said track members between a retracted position resting on said framework and a raised position supporting said vehicle above said framework, and adjustable locking members bers between at least one of said track members and said framework to lock said track members in the raised position above said framework established by said hydraulic lift means; and
a raised platform extending between said track members, said raised platform including longitudinally extending tracks, a wheeled dolly supported on said platform for longitudinal movement thereon, said dolly including dolly wheels inserted in said guide tracks for movement therealong.

12. A portable lift apparatus according to claim 11, said track members in the form of longitudinally extending channels, ramp members extendible from said channels to slope downwardly and rearwardly to a ground surface from said channels to facilitate driving a vehicle onto said track members, said ramp members being telescopically received within said channels of said track members and releasably connected thereto.

13. A portable lift apparatus according to claim 11, including an oil storage tank mounted on said framework and a movable drain pan supported on said framework for draining oil from a vehicle being serviced into said oil tank, said movable drain pan including a flexible hose extending between said drain pan and said tank, and a support arm and swivel support means for releasably receiving said support arm for swiveled movement of said drain pan into a position beneath the vehicle being serviced.

14. A portable lift apparatus according to claim 11, said framework including a storage area covered by said outboard extension means when said track members are in the lowered position and said storage area being uncovered when said track members are lifted to the raised position.

15. A portable lift apparatus according to claim 11, said hydraulic lift means including hydraulic cylinders pivotally connected to each of said track members, and said pivot link means including pivot links pivotally connected to said track members flanking opposite sides of each of said hydraulic cylinders.

* * * * *